3,384,643
1-HYDROCARBYLSULFONYL-2,2-DICHLORO (OR DIALKOXY)-4,5-IMIDAZOLIDINE DIONES
Adnan A. R. Sayigh, North Haven, and Henri Ulrich, Northford, Conn., assignors to The Upjohn Company, Kalamazoo, Mich., a corporation of Delaware
No Drawing. Filed Feb. 17, 1965, Ser. No. 433,498
13 Claims. (Cl. 260—309.7)

ABSTRACT OF THE DISCLOSURE

Novel 1-alkyl- or aryl-sulfonyl-2,2-dialkoxy-4,5-imidazolidine diones are prepared by alcoholysis of the corresponding 2,2-dichloro compounds. The latter are also novel and obtained by reaction of oxalyl chloride with the appropriately substituted sulfonylcarbodiimide. The novel 2,2-dialkoxy and 2,2-dichloro compounds are intermediates, by hydrolysis, for the corresponding sulfonylureas which have antidiabetic activity.

---

This invention relates to novel intermediates in the production of useful, oral antidiabetics of the sulfonylurea type and is more particularly concerned with the production of 1-alkyl- or 1-aryl substituted sulfonyl-2,2-dichloro-3-substituted-4,5-imidazolidinediones, 1-alkyl- or aryl substituted sulfonyl-2,2-dialkoxy - 3 - substituted-4,5-imidazolidinediones, and a process for the production thereof.

The novel compounds and the process of production thereof can be illustratively represented by the following formulae:

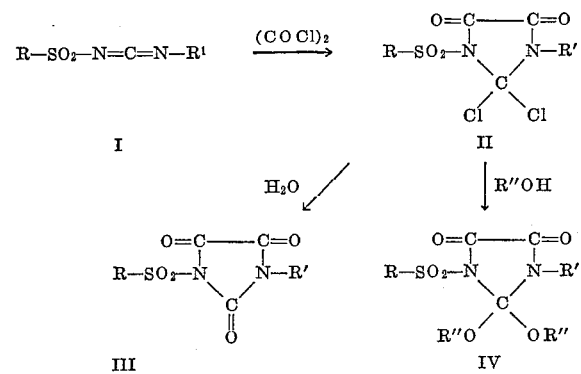

wherein R is selected from the group consisting of alkyl radicals having from 1 to 6 carbon atoms, inclusive cycloalkyl radicals having from 5 to 8 carbon atoms, inclusive, phenyl, alkylphenyls in which the alkyl group is defined as above, p-chlorophenyl, p-acetylphenyl, p-alkoxy-, m-alkoxy- and p,m-dialkoxyphenyl in which the alkyl radicals of the alkoxy group are defined as hereinabove, wherein R' is selected from alkyl radicals defined as above, and the hexamethyleneimino radical, and wherein R" is an alkyl group having from 1 to 4 carbon atoms, inclusive.

Examples of alkyl groups as herein described are, for R": methyl, ethyl, propyl, isopropyl, butyl, isobutyl; for R: the same as for R' and additionally pentyl, 1-methylbutyl, 1-methylpropyl, hexyl, 1-methylpentyl, 1-ethylbutyl and the like; for R': ethyl, propyl, isopropyl, butyl, isobutyl, pentyl, 1-methylbutyl, 1-methylpropyl, 1-methylpentyl, hexyl, 1-ethylbutyl, heptyl, octyl and the like.

Examples of cycloalkyls as used in this invention are cyclopentyl, cyclohexyl, cycloheptyl, cyclooctyl and the like.

Examples of aryl as herein used are phenyl, tolyl, 4-ethylphenyl, 4-propylphenyl, 4 - butylphenyl, 4-hexyl- phenyl, 4-chlorophenyl, 4-bromophenyl, 4-methoxyphenyl, 4-ethoxyphenyl, 3,4-dimethoxyphenyl, 4-hexyloxyphenyl, 4-acetoxyphenyl and the like.

The process of this invention comprises: treating a substituted carbodiimide of Formula I, above, with oxalyl chloride to obtain the corresponding 1-alkyl- or aryl-substituted sulfonyl-2,2-dichloro-3 - substituted-4,5-imidazolidinedione (II); and hydrolyzing Compound II with either water to give the corresponding 1,3-substituted parabanic acid (III) or a lower alkanol, such as methanol, ethanol, propanol, or butanol, to give the corresponding 1,3-disubstituted-2,2-dialkoxy-4,5 - imidazolidinedione of Formula IV.

The novel Compounds II and IV likewise as the compounds of Formula III are useful as intermediates for the production of sulfonylurea compounds of the Formula V:

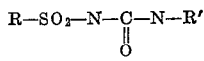

in which R and R' have the same significance as above.

The compounds of Formula V are obtained by, for example, heating 1-alkyl- or aryl-substituted sulfonyl-2,2-dichloro-3-substituted-4,5-imidazolidinediones of Formula II with water to give the substituted parabanic acids of Formula III which when heated with aqueous alkali give the sulfonylureas of Formula V. 1-alkyl- or aryl-substitute sulfonyl-2,2-dichloro- as well as 2,2-dialkylkoxy-3-substituted-4,5-imidazolidinediones of Formulae II and IV can also be hydrolyzed with a mineral acid such a hydrochloric acid to give the sulfonylureas of structural Formula V. The sulfonylureas, particularly those in which R is a substituted phenyl group, such as p-chlorophenyl, p-tolyl- (p-methylphenyl), and in which R' is alkyl, such as ethyl, propyl, n-butyl, hexamethyleneimino and the like, are important hypoglycemic agents of which many are commercially used in the treatment of diabetes mellitus.

The starting sulfonyl carbodiimides of this invention are generally prepared by reacting arylsulfonylthioureas (Chem. Rev. 50, 1–46, 1952, and Ber. 83, 551, 1950) with an acid halide, for example, phosgene, in the presence of an inert solvent under substantially anhydrous conditions at a temperature first between 0–60° and thereupon at a higher temperature, preferably between 75–150°. Details of the methods of production are further shown in the preparations.

In carrying out the process of the present invention, the selected sulfonyl carbodiimide of Formula I is reacted with oxalyl chloride, preferably in a suitable solvent unreactive with oxalyl chloride and carbodiimide. Such solvents are carbon tetrachloride, chloroform, methylene chloride, ethylene chloride, benzene, toluene, or the like, with carbon tetrachloride preferred. Equimolar amounts of sulfonyl carbodiimide (I) and of oxalyl chloride are preferably used in this reaction but slightly smaller or larger than molar amounts of oxalyl chloride per mole of carbodiimide are operative. The reaction can be carried out between 0° C. and the boiling point of the solvent, but is preferentially carried out at room temperatures between 20–30°. The reaction proceeds slowly and, at room temperature, 6 to 36 hours are required for the completion of the reaction. The desired 1-substituted-sulfonyl - 2,2 - dichloro-3-substituted-4,5-imidazolidinedione thus obtained is isolated from the mixture by conventional procedures, e.g., by partial evaporation of the solvent and cooling. The material which precipitates under these conditions is thereupon collected, and can be purified by recrystallization or used in the crude form for the hydrolysis step with water to give the parabanic acid of Formula III or with a lower alkanol to give the compounds of Formula IV. The various methods of hydrolysis are disclosed in detail in the subsequent examples.

The following preparations and examples are illustrative of the process and products of the present invention, but are not to be construed as limiting.

PREPARATION 1

N-phenylsulfonyl-N'-ethylcarbodiimide

To 9.76 g. (0.04 mole) of N-phenylsulfonyl-N'-ethylthiourea in 60 ml. of dry chlorobenzene was added 4 g. (0.04 mole) of phosgene in 40 ml. of dry chlorobenzene dropwise with cooling and stirring over a period of 14 minutes at 5° C. After stirring for 90 minutes at 25° C., the reaction mixture was heated to 132° C. for 50 minutes while nitrogen was passed through the reaction mixture. A small amount of solid material was removed by filtration and upon evaporation of the chlorobenzene 7.8 g. of crude product was obtained. Distillation under reduced pressure produced 4 g. (47.6%) of N-phenylsulfonyl-N'-ethylcarbodiimide, B.P. 139–144° C. (0.2 mm.).

*Analysis.*—Calcd. for $C_9H_{10}N_2O_2S$: C, 51.41; H, 4.79; N, 13.32. Found: C, 51.37; H, 4.80; N, 13.11.

In the same manner as shown above,

N-phenylsulfonyl-N'-methylcarbodiimide,
N-phenylsulfonyl-N'-propylcarbodiimide,
N-phenylsulfonyl-N'-isopropylcarbodiimide,
N-phenylsulfonyl-N'-isobutylcarbodiimide,
N-phenylsulfonyl-N'-pentylcarbodiimide,
N-phenylsulfonyl-N'-isopentylcarbodiimide, and
N-phenylsulfonyl-N'-hexylcarbodiimide are prepared by substituting N-phenylsulfonyl-N'-methylthiourea,
N-phenylsulfonyl-N'-propylthiourea,
N-phenylsulfonyl-N'-isopropylthiourea,
N-phenylsulfonyl-N'-isobutylthiourea,
N-phenylsulfonyl-N'-pentylthiourea,
N-phenylsulfonyl-N'-isopentylthiourea, and
N-phenylsulfonyl-N'-hexylthiourea, respectively, for N-phenylsulfonyl-N'-ethylthiourea.

PREPARATION 2

N-(p-tolylsulfonyl)-N'-ethylcarbodiimide

To 7.74 g. (0.03 mole) of N-(p-tolylsulfonyl)-N'-ethylthiourea in 50 ml. of dry chlorobenzene was added 3 g. (0.03 mole) of phosgene in 30 ml. of dry chlorobenzene dropwise with stirring and cooling over a period of 11 minutes at 3–4° C. After stirring for 1 hour at temperatures between 25–28° C., the reaction mixture was refluxed for 40 minutes with nitrogen passing through the reaction mixture. Evaporation of the chlorobenzene gave 6.6 g. of crude product which upon distillation under reduced pressure produced pure N-(p-tolylsulfonyl)-N'-ethylcarbodiimide, B.P. 147–151° C. (0.25 mm.) (in 40.2% yield).

*Analysis.*—Calcd. for $C_{10}H_{12}N_2O_2S$: C, 53.55; H, 5.39; N, 12.49; S, 14.30. Found: C, 53.56; H, 5.26; N, 12.62; S, 14.42.

In the same manner as shown above, N-[(4-ethylphenyl)sulfonyl] - N' - ethylcarbodiimide, N-[(3-propylphenyl)sulfonyl] - N' - ethylcarbodiimide, and N - [(4-butylphenyl)sulfonyl] - N' - ethylcarbodiimide are prepared by substituting N - [(4 - ethylphenyl)sulfonyl]-N'-ethylthiourea, N - [(3 - propylphenyl)sulfonyl]-N'-ethylthiourea, and N - [(4 - butylphenyl)sulfonyl]-N'-ethylthiourea, respectively, for N-(p-tolylsulfonyl)-N'-ethylthiourea.

PREPARATION 3

N-phenylsulfonyl-N'-butylcarbodiimide

To 10.88 g. (0.04 mole) of N-phenylsulfonyl-N'-butylthiourea in 20 ml. of chlorobenzene was added 3.9 g. (0.04 mole) of phosgene in 40 ml. of dry chlorobenzene dropwise with stirring and cooling over a period of 11 minutes at 3° C. After stirring for 70 minutes at temperatures between 25–28° C., the reaction mixture was refluxed for 80 minutes at 130–132° C. while nitrogen was passed through for the first 30 minutes. A small amount of solid material was removed by filtration and evaporation of the solvent afforded 8.9 g. of crude product. Distillation under reduced pressure produced 3.8 g. (40%) of N-phenylsulfonyl - N' - butylcarbodiimide, B.P. 151–155° C. (0.1 mm.).

*Analysis.*—Calcd. for $C_{11}H_{14}N_2O_2S$: C, 55.45; H, 5.92; N, 11.75. Found: C, 55.51; H, 5.89; N, 11.70.

In the same manner as shown above, N-phenylsulfonyl-N' - cyclopentylcarbodiimide, N-phenylsulfonyl-N'-cyclohexylcarbodiimide, N-phenylsulfonyl - N' - cycloheptylcarbodiimide, and N-phenylsulfonyl - N' - cyclooctylcarbodiimide are prepared by substituting N-phenylusulfonyl-N'-cyclopentylthiourea, N-phenylusulfonyl-N'-cyclohexylthiourea, N-phenylusulfonyl-N'-cycloheptylthiourea and N-phenylsulfonyl-N'-cyclooctylthiourea, respectively, for N-phenylsulfonyl-N'-butylthiourea.

PREPARATION 4

N-(-p-tolylsulfonyl)-N'-butylcarbodiimide

To 13.44 g. (0.047 mole) of N-(p-tolylsulfonyl)-N'-butylthiourea in 94 ml. of dry chlorobenzene was added 4.7 g. (0.047 mole) of phosgene in 40 ml. of dry chlorobenzene dropwise with stirring and ice cooling over a period of 11 minutes at 4° C. After stirring for 10 minutes at about 40° C., nitrogen was passed through the reaction mixture and the mixture was refluxed for 70 minutes at 130–132° C. Evaporation of the chlorobenzene gave 12.3 g. of crude product. Distillation under reduced pressure produced 5.6 g. (47.3%) of N-(p-tolylsulfonyl)-N'-butylcarbodiimide, B.P. 159–162° C. (0.2 mm.).

*Analysis.*—Calcd. for $C_{12}H_{16}N_2O_2S$: C, 57.12; H, 6.38; N, 11.10; S, 12.70. Found: C, 56.36; H, 6.36; N, 11.05; S, 13.17.

In the same manner as shown above, N-(p-tolylsulfonyl)-N'-cyclopentylcarbodiimide, N - (p-tolylsulfonyl)-N'-cyclohexylcarbomiide, N - (p-tolyluslfonyl)-N'-cycloheptylcarbodiimide, N - (p - tolylsulfonyl)-N'-cyclooctylcarbodiimide, N-[(4-ethylphenyl)sulfonyl]-N'-cyclohexylcarbodiimide, N - [(4 - propylphenyl)sulfonyl]-N'-cycloheptylcarbodiimide, and N-[(3-butylphenyl)sulfonyl]-N'-cyclooctylcarbodiimide are prepared by substituting N-(p-tolylsulfonyl)-N'-cyclopentylthiourea, N-(p-tolylsulfonyl)-N'-cyclohexylthiourea, N - (p - tolylsulfonyl)-N'-cycloheptylthiourea, N - (p-tolylsulfonyl)-N'-cyclooctylthiourea, N - [(4 - ethylphenyl)sulfonyl]-N'-cyclohexylthiourea, N - [(4-propylphenyl)sulfonyl]-N'-cycloheptylthiourea, and N-[(3-butylphenyl)sulfonyl]-N'-cyclooctylthiourea, respectively, for N-(p-tolylsulfonyl)-N'-butylthiourea.

PREPARATION 5

N-(p-tolylsulfonyl)-N'-butylcarbodiimide

To 11.54 g. (0.04 mole) of N-(p-tolylsulfonyl)-N'-butylthiourea suspended in 120 ml. of carbon tetrachloride was added 8.32 g. (0.04 mole) of phosphorus pentachloride. On heating at 35° C. evolution of hydrogen chloride was observed and the phosphorus pentachloride was consumed within 15 minutes (temperature 35-47° C.). The reaction mixture was refluxed at 77–78° C. for 5 hours and on evaporation of the solvent and distillation under reduced pressure produced 7.7 g. (75.5%) of N-(p-tolylsulfonyl)-N'-butylcarbodiimide, B.P. 185–186° C. 1.3 mm.).

In the same manner as shown above, N-[(3,4-dimethylphenyl)-sulfonyl]-N'-butylcarbodiimide, N - [(3-chloro - 4 - methylphenyl)sulfonyl] - N' - propylcarbodiimide, N - [(3 - ethyl-4-ethyphenyl)sulfonyl]-N'-propylcarbodiimide, and N-[(3-chloro-4-methoxyphenyl)-sulfonyl]-N'-piperidinocarbodiimide are prepared by substituting N - [(3,4 - dimethylphenyl)sulfonyl] - N' - butylthiourea, N - [(3 - chloro-4-methylphenyl)sulfonyl]-N'-propylthiourea, N - [(3-ethyl-4-ethoxyphenyl)-sulfonyl]-N'-[(3-chloro-4-methoxyphenyl)sulfonyl] - N' - piperidinothiourea for N-(p-tolylsulfonyl)-N'-butylthiourea.

PREPARATION 6

N-(p-tolylsulfonyl)-N'-hexamethyleneiminocarbodiimide

In the same manner as shown in Preparation 1, N-(p-tolylsulfonyl)-N'-hexamethyleneiminocarbodiimide was prepared by substituting N-(p-tolylsulfonyl)-N'-hexamethyleneiminothiourea for N-phenylsulfonyl-N'-ethylthiourea.

PREPARATION 7

N-[(4-chlorophenyl)sulfonyl]-N'-propylcarbodiimide

In the same manner as shown in Preparation 1, N-[(4-chlorophenyl)sulfonyl] - N' - propylcarbodiimide was prepared by substituting N-[(4-chlorophenyl)sulfonyl]-N'-propylthiourea for N-phenylsulfonyl-N'-ethylthiourea.

Similarly,

N-[(4-chlorophenyl)sulfonyl]-N'-cycloheptylcarbodiimide,
N-[(4-bromophenyl)sulfonyl]-N'-cycloheptylcarbodiimide,
N-[(4-chlorophenyl)sulfonyl]-N'-butylcarbodiimide,
N-[(4-chlorophenyl)sulfonyl]-N'-methylcarbodiimide,
N-[(4-bromophenyl)sulfonyl]-N'-butylcarbodiimide,
N-[(3-chlorophenyl)sulfonyl]-N'-butylcarbodiimide,
N-[(4-chlorophenyl)sulfonyl]-N'-hexamethyleneiminocarbodiimide,
and N-[(4-chlorophenyl)sulfonyl]-N'-piperidinocarbodiimide are prepared by substituting N-[(4-chlorophenyl)sulfonyl]-N'-cycloheptylthiourea,
N-[(4-bromophenyl)sulfonyl]-N'-cycloheptylthiourea,
N-[(4-chlorophenyl)-sulfonyl]-N'-butylthiourea,
N-[(4-chlorophenyl)sulfonyl]-N'-methylthiourea,
N-[(4-bromophenyl)sulfonyl]-N'-butylthiourea,
N-[(2-chlorophenyl)sulfonyl]-N-butylthiourea,
N-[(4-chlorophenyl)sulfonyl]-N'-hexamethyleneiminothiourea, and
N-[(4-chlorophenyl)sulfonyl]-N'-piperidinothiourea, respectively, for N-phenylsulfonyl-N'-ethylthiourea in Preparation 1.

PREPARATION 8

N-[(4-methoxyphenyl)sulfonyl]-N'-cyclohexylcarbodiimide

In the same manner as shown in Preparation 1, N-[(4-methoxyphenyl)sulfonyl] - N' - cyclohexylcarbodiimide was prepared by substituting N-[(4-methoxyphenyl)sulfonyl]-N'-cyclohexylthiourea for N-phenylsulfonyl-N'-ethylthiourea.

Similarly,

N-[(4-methoxyphenyl)sulfonyl]-N'-butylcarbodiimide,
N-[(4-methoxyphenyl)sulfonyl]-N'-methylcarbodiimide,
N-[(3-methoxyphenyl)sulfonyl]-N'-propylcarbodiimide,
N-[(4-ethoxyphenyl)sulfonyl]-N'-butylcarbodiimide,
N-[(3,4-dimethoxyphenyl)-sulfonyl]-N'-pentylcarbodiimide,
N-[(4-propoxyphenyl)sulfonyl]-N'-isobutylcarbodiimide,
N-[(4-methoxyphenyl)sulfonyl]-N'-hexamethyleneiminocarbodiimide,
N-[(4-butoxyphenyl)sulfonyl]-N'-ethylcarbodiimide, and
N-[(4-methoxyphenyl)sulfonyl]-N'-piperidinocarbodiimide
are prepared by substituting N-[(4-methoxyphenyl)sulfonyl]-N'-butylthiourea,
N-[4-methoxyphenyl)sulfonyl]-N'-methylthiourea,
N-[(3-methoxyphenyl)sulfonyl]-N'-propylthiourea,
N-[4-ethoxyphenyl)sulfonyl]-N'-butylthiourea,
N-[(3-4-dimethoxyphenyl)sulfonyl]-N'-pentylthiourea,
N-[(4-propoxyphenyl)sulfonyl]-N'-isobutylthiourea,
N-[(4-methoxyphenyl)sulfonyl]-N'-hexamethyleneiminothiourea,
N-[(4-butoxyphenyl)sulfonyl]-N'-ethylthiourea, and
N-[(4-methoxyphenyl)sulfonyl]-N'-piperidinothiourea, respectively, for N-phenylsulfonyl-N'-ethylthiourea in Preparation 1.

PREPARATION 9

N-[(4-acetylphenyl)sulfonyl]-N'-cyclohexylcarbodiimide

In the same manner as shown in Preparation 1, N-[(4-acetylphenyl)sulfonyl] - N' - cyclohexylcarbodiimide was prepared by substituting N-[(4-acetylphenyl)sulfonyl]-N'-cyclohexylthiourea for N-phenylsulfonyl-N'-ethylthiourea.

Similarly,

N-[(4-acetylphenyl)sulfonyl]-N'-hexamethyleneiminocarbodiimide,
N-[(4-propionylphenyl)sulfonyl]-N'-piperidinocarbodiimide,
N-[(3-butyrylphenyl)sulfonyl]-N'-propylcarbodiimide,
N-[(4-acetylphenyl)sulfonyl]-N'-butylcarbodiimide,
N-[(4-acetylphenyl)sulfonyl]-N'-methylcarbodiimide,
N-[(4-acetylphenyl)sulfonyl]-N'-cycloheptylcarbodiimide and
N - [(4-acetylphenyl)sulfonyl]-N'-cyclooctylcarbodiimide are prepared by substituting N-[(4-acetylphenyl)sulfonyl]-N'-hexamethyleneiminothiourea,
N-[(4-propionylphenyl)sulfonyl]-N'-piperidinothiourea,
N-[(3-butyrylphenyl)sulfonyl]-N'-propylthiourea,
N-[(4-acetylphenyl)sulfonyl]-N'-butylthiourea,
N-[(4-acetylphenyl)sulfonyl]-N'-methylthiourea,
N-[(4-acetylphenyl)sulfonyl]-N'-cycloheptylthiourea, and
N-[4-acetylphenyl)sulfonyl]-N'-cyclooctylthiourea, respectively, for N-phenylsulfonyl-N'-ethylthiourea in Preparation 1.

PREPARATION 10

N-methylsulfonyl-N'-n-propylcarbodiimide

To 12.7 g. (0.065 mole) of N-methylsulfonyl-N'-n-propylthiourea in 87 ml. of dry chlorobenzene was added 6.5 g. (0.065 mole) of phosgene in 40 ml. of dry chlorobenzene with cooling and stirring over a period of 17 minutes at 3–4° C. After stirring for 30 minutes while the temperature was allowed to come to 20° C., the reaction mixture was refluxed for 30 minutes at 130° C. with nitrogen passing through the reaction mixture to remove traces of phosgene. Evaporation of the chlorobenzene afforded 11 g. of crude product which was distilled under reduced pressure to afford 7.7 g. (73.3%) of N-methylsulfonyl-N'-n-propylcarbodiimide, B.P. 93° C. (0.25 mm.).

*Analysis.*—Calcd. for $C_5H_{10}N_2O_2S$: C, 37.02; H, 6.21; N, 17.26. Found: C, 37.58; H, 6.30; N, 17.37.

EXAMPLE 1

1-(p-tolylsulfonyl)-2,2-dichloro-3-n-butyl-4,5-imidazolidinedione

To 2.52 g. (0.01 mole) of p-tolylsulfonyl-n-butyl carbodiimide in 30 ml. of carbon tetrachloride, 1.27 g. (0.01 mole) of oxalyl chloride in 10 ml. of carbon tetrachloride was added. Upon standing for 20 hours at room temperature, complete reaction was indicated by the absence of N=C=N absorption at 4.6 in the infrared spectrum. After the carbon tetrachloride was nearly evaporated, 2.8 g. (74%) of 1-(p-tolylsulfonyl)2,2-dichloro-3-n-butyl-4,5-imidazolidinedione of melting point 125° C. precipitated.

*Analysis.*—Calcd. for $C_{14}H_{16}Cl_2N_2O_4S$: C, 44.33; H, 4.25; N, 7.39. Found: C, 44.40; H, 4.24; N, 7.65.

EXAMPLE 2

1-phenylsulfonyl-2,2-dichloro-3-ethyl-4,5-imidazolidinedione

In the same manner given in Example 1, N-phenylsulfonyl-N'-ethylcarbodiimide was treated with oxalyl chloride in carbon tetrachloride solution to give 1-phenylsulfonyl-2,2-dichloro-3-ethyl-4,5-imidazolidinedione.

EXAMPLE 3

1-phenylsulfonyl-2,2-dichloro-3-isobutyl-4,5-imidazolidinedione

In the manner given in Example 1, N-phenylsulfonyl-N'-isobutylcarbodiimide is reacted with oxalyl chloride in carbon tetrachloride solution to give 1-phenylsulfonyl-2,2-dichloro-3-isobutyl-4,5-imidazolidinedione.

EXAMPLE 4

1-phenylsulfonyl-2,2-dichloro-3-n-propyl-4,5-imidazolidinedione

In the manner given in Example 1, N-phenylsulfonyl-N'-n-propylcarbodiimide is reacted with oxalyl chloride in carbon tetrachloride solution to give 1-phenylsulfonyl-2,2-dichloro-3-n-propyl-4,5-imidazolidinedione.

EXAMPLE 5

1-phenylsulfonyl-2,2-dichloro-3-n-pentyl-4,5-imidazolidinedione

In the manner given in Example 1, N-phenylsulfonyl-N'-n-pentylcarbodiimide is reacted with oxalyl chloride in carbon tetrachloride solution to give 1-phenylsulfonyl-2,2-dichloro-3-n-pentyl-4,5-imidazolidinedione.

EXAMPLE 6

1-(p-tolylsulfonyl)-2,2-dichloro-3-ethyl-4,5-imidazolidinedione

In the manner given in Example 1, N-(p-tolylsulfonyl)-N'-ethylcarbodiimide was reacted with oxalyl chloride in carbon tetrachloride solution to give 1-(p-tolylsulfonyl)-2,2-dichloro-3-ethyl-4,5-imidazolidinedione.

EXAMPLE 7

1-[(4-n-butylphenyl)sulfonyl]-2,2-dichloro-3-ethyl-4,5-imidazolidinedione

In the manner given in Example 1, N-[4-n-butylphenyl)sulfonyl]-N'-ethylcarbodiimide was reacted with oxalyl chloride in carbon tetrachloride solution to give 1-[(4-n-butylphenyl)sulfonyl] - 2,2 - dichloro - 3 - ethyl - 4,5-imidazolidinedione.

EXAMPLE 8

1-[(3-n-propylphenyl)sulfonyl]-2,2-dichloro-3-ethyl-4,5-imidazolidinedione

In the manner given in Example 1, N-[(3-n-propylphenyl)sulphonyl]–N'-ethylcarbodiimide was reacted with oxalyl chloride in carbon tetrachloride solution to give 1-[(3 - n - propylphenyl)sulfonyl] - 2,2 - dichloro - 3-ethyl-4,5-imidazolidinedione.

EXAMPLE 9

1-(p-tolylsulfonyl)-2,2-dichloro-3-n-propyl-4,5-imidazolidinedione

In the manner given in Example 1, N-(p-tolylsulfonyl)-N'-n-propylcarbodiimide was reacted with oxalyl chloride in carbon tetrachloride solution to give 1-(p-tolylsulfonyl) 2,2 - dichloro - 3 - n - propyl - 4,5 - imidazolidinedione.

EXAMPLE 10

1-(p-tolylsulfonyl)-2,2-dichloro-3-cyclopentyl-4,5-imidazolidinedione

In the manner given in Example 1, N-(p-tolylsulfonyl)-N'-cyclopentylcarbodiimide was reacted with oxalyl chloride in carbon tetrachloride solution to give 1-(p-tolylsulfonyl) - 2,2 - dichloro - 3 - cyclopentyl - 4,5 - imidazolidinedione.

EXAMPLE 11

1-(p-tolylsulfonyl)-2,2-dichloro-3-cyclooctyl-4,5-imidazolidinedione

In the manner given in Example 1, N-(p-tolylsulfonyl)-N'-cyclooctylcarbodiimide was reacted with oxalyl chloride in carbon tetrachloride solution to give 1-(p-tolylsulfonyl) - 2,2 - dichloro - 3 - cyclooctyl - 4,5 - imidazolidinedione.

EXAMPLE 12

1-(p-tolylsulfonyl)2,2-dichloro-3-hexamethylene-imino-4,5-imidazolidinedione

In the manner given in Example 1, N-(p-tolylsulfonyl)-N'-hexamethyleneiminocarbodiimide was reacted with oxalyl chloride in carbon tetrachloride solution to give 1 - (p - tolylsulfonyl) - 2,2 - dichloro - 3 - hexamethyleneimino-4,5-imidazolidinedione.

EXAMPLE 13

1-[(4-chlorophenyl)sulfonyl]2,2-dichloro-3-n-propyl-4,5-imidazolidinedione

In the manner given in Example 1, N-[(4-chlorophenyl)sulfonyl]-N'-n-propylcarbodiimide was reacted with oxalyl chloride in carbon tetrachloride solution to give 1 - [(4-chlorophenyl)sulfonyl] - 2,2 - dichloro - 3-n-propyl-4,5-imidazolidinedione.

EXAMPLE 14

1-[(4-chlorophenyl(sulfonyl]2,2-dichloro-3-cycloheptyl-4,5-imidazolidinedione

In the manner given in Example 1, N-[(4-chlorophenyl)sulfonyl]-N'-cycloheptylcarbodiimide was reacted with oxalyl chloride in carbon tetrachloride solution to give 1 - [(4 - chlorophenyl) - sulfonyl] - 2,2 - dichloro-3-cycloheptyl-4,5-imidazolidinediones.

EXAMPLE 15

1-[(4-bromophenyl)sulfonyl]2,2-dichloro-3-cycloheptyl-4,5-imidazolidinedione

In the manner given in Example 1, N-[(4-bromophenyl)sulfonyl]-N'-cycloheptylcarbodiimide was reacted with oxalyl chloride in carbon tetrachloride solution to give 1 - [(4 - bromophenyl)sulfonyl] - 2,2 - dichloro-3-cycloheptyl-4,5-imidazolidinediones.

EXAMPLE 16

1-[(4-chlorophenyl)sulfonyl]-2,2-dichloro-3-hexamethyleneimino-4,5-imidazolidinedione In the manner given in Example 1, N-[(4-chlorophenyl)sulfonyl] - N' - hexamethyleneiminocarbodiimide was reacted with oxalyl chloride in carbon tetrachloride solution to give 1 - [(4 - chlorophenyl)sulfonyl] - 2,2-dichloro - 3 - hexamethyleneimino 4,5 - imidazolidinedione.

EXAMPLE 17

1-[(4-acetylphenyl)sulfonyl]-2,2-dichloro-3-cyclohexyl-4,5-imidazolidinedione

In the manner given in Example 1, N-[(4-acetylphenyl)sulfonyl]-N'-cyclohexylcarbodiimide was reacted with oxalyl chloride in carbon tetrachloride solution to give 1 - [(4 - acetylphenyl)sulfonyl] 2,2 - dichloro - 3 - cyclohexyl-4,5 imidazolidinedione.

EXAMPLE 18

1-[(4-acetylphenyl)sulfonyl]-2,2-dichloro-3-hexamethyleneimino-4,5-imidazolidinedione In the manner given in Example 1, N-[(4-acetylphenyl)sulfonyl] - N' - hexamethyleneiminocarbodiimide was reacted with oxalyl chloride in carbon tetrachloride solution to give 1 - [(4 - acetylphenyl)sulfonyl] - 2,2-dichloro - 3 - hexamethyleneimino - 4,5 - imidazolidinedione.

EXAMPLE 19

1[(4-butyrylphenyl)sulfonyl]-2,2-dichloro-3-propyl-4,5-imidazolidinedione

In the manner given in Example 1, N-[(4 butyrylphenyl)sulfonyl]-N′-propylcarbodiimide was reacted with oxalyl chloride in carbon tetrachloride solution to give 1 - [(4 - butyrylphenyl)sulfonyl] - 2,2 - dichloro - 3-propyl-4,5-imidazolidinedione.

EXAMPLE 20

1-[(4-hexanoylphenyl)sulfonyl]2,2-dichloro-3-n-butyl-4,5-imidazolidinedione

In the manner given in Example 1, N-[(4-hexanoylphenyl)sulfonyl]-N′-n-butylcarbodiimide was reacted with oxalyl chloride in carbon tetrachloride solution to give 1 - [(4 - hexanoyl - phenyl)sulfonyl] - 2,2 - dichloro-3-n-butyl 4,5-imidazolidinedione.

EXAMPLE 21

1-methylsulfonyl-2,2-dichloro-3-n-propyl-4,5-imidazolidinedione

To a mixture of 0.81 g. (0.005 mole) of 1-methylsulfonyl-3-n-propylcarbodiimide in 8 ml. of carbon tetrachloride, 0.635 g. (0.005 mole) of oxalyl chloride in 6 ml. of carbon tetrachloride was added. Upon standing for 20 hours 1.2 g. (83.3%) of crude material was obtained which, after recrystallization from carbon tetrachloride, gave pure 1 - methylsulfonyl - 2,2 - dichloro - 3 - n-propyl-4,5-imidazolidinedione of M.P. 128° C.

In the manner given in Example 1, other 1-alkyl- or aryl- substituted-sulfonyl-2,2-dichloro - 3 - substituted-4,5-imidazolidinediones can be prepared by reacting selected N-substituted-alkyl- or aryl-substituted-sulfonyl-N′-substituted-carbodiimides with oxalyl chloride in a solvent inert to the reactants. Representative imidazolidinediones thus obtained include 1-phenylsulfonyl-2,2-dichloro-3-n-butyl-4,5-imidazolidinedione,
1-phenylsulfonyl-2,2-dichloro-3-isopropyl-4,5-imidazolidinedione,
1-phenylsulfonyl-2,2-dichloro-3-isopentyl-4,5-imidazolidinedione,
1-phenylsulfonyl-2,2-dichloro-3-n-hexyl-4,5-imidazolidinedione,
1-[(4-ethylphenyl)sulfonyl]-2,2-dichloro-3-ethyl-4,5-imidazolidinedione
1-phenylsulfonyl-2,2-dichloro-3-cyclohexyl-4,5-imidazolidinedione,
1-phenylsulfonyl-2,2-dichloro-3-cyclooctyl-4,5-imidazolidinedione,
1-(p-tolylsulfonyl)-2,2-dichloro-3-cycloheptyl-4,5-imidazolidinedione,
1-[(4-propylphenyl)sulfonyl]-2,2-dichloro-3-cycloheptyl-4,5-imidazolidinedione,
1-[(4-chlorophenyl)-sulfonyl]-2,2-dichloro-3-butyl-4,5-imidazolidinedione,
1-[(4-chlorophenyl)sulfonyl]-2,2-dichloro-3-piperidino-4,5-imidazolidinedione,
1-[(4-propylphenyl)sulfonyl]-2,2-dichloro-3-butyl-4,5-imidazolidinedione,
1-[(4-bromophenyl)sulfonyl]-2,2-dichloro-3-cycloheptyl-4,5-imidazolidinedione,
1-[(3-methoxyphenyl)sulfonyl]-2,2-dichloro-3-propyl-4,5-imidazolidinedione,
1-[(3,4-dimethoxyphenyl)sulfonyl]-2,2-dichloro-3-n-pentyl-4,5-imidazolidinedione,
1-[(4-acetylphenyl)sulfonyl]-2,2-dichloro-3-cycloheptyl-4,5-imidazolidinedione,
1-methanesulfonyl-2,2-dichloro-3-n-butyl-4,5-imidazolidinedione,
1-ethylsulfonyl-2,2-dichloro-3-ethyl-4,5-imidazolidinedione,
1-n-butylsulfonyl-2,2-dichloro-3-cyclohexyl-4,5-imidazolidinedione,
1-n-hexanesulfonyl-2,2-dichloro-3-n-butyl-4,5-imidazolidinedione,
1-cyclohexanesulfonyl-2,2-dichloro-3-n-butyl-4,5-imidazolidinedione,
1-cyclopentanesulfonyl-2,2-dichloro-3-propyl-4,5-imidazolidinedione, and the like.

EXAMPLE 22

1-(p-tolylsulfonyl)-3-n-butyl parabanic acid

To 0.38 g. (0.001 mole) of 1-(p-tolylsulfonyl)-2,2-dichloro-3-n-butyl-4,5-imidazolidinedione in 5 ml. of acetone a few drops of water was added and the reaction mixture was refluxed for 5 minutes. Addition of water precipitated the parabanic acid derivative (melting point 125–127° C.). The crude material was recrystallized from benzene-ligroin to give 1-(p-tolylsulfonyl)-3-n-butyl parabanic acid in 92.5% yield and of a melting point of 128° C.

*Analysis.*— Calcd. for $C_{14}H_{16}N_2O_5S$: C, 51.84; H, 4.96; N, 8.63. Found: C, 51.41; H, 4.92; N, 8.82.

EXAMPLE 23

1-(p-tolylsulfonyl)-3-ethyl parabanic acid

In the manner given in Example 22, 1-(p-tolylsulfonyl)-2,2-dichloro - 3 - ethyl-4,5-imidazolidinedione was hydrolyzed in acetone with a very small amount of water (0.3 ml. in 8 ml. of water) to give 1-(p-tolylsulfonyl)-3-ethyl parabanic acid.

EXAMPLE 24

1-phenylsulfonyl-3-n-butyl parabanic acid

In the manner given in Example 22, 1-phenylsulfonyl-2,2-dichloro-3-n-butyl - 4,5 - imidazolidinedione was hydrolyzed to give 1-phenylsulfonyl-3-n-butyl parabanic acid.

EXAMPLE 25

1-phenylsulfonyl-3-ethyl parabanic acid

In the manner given in Example 22, 1-phenylsulfonyl-2,2-dichloro-3-ethyl - 4,5 - imidazolidinedione was hydrolyzed to give 1-phenylsulfonyl-3-ethyl parabanic acid.

EXAMPLE 26

1-phenylsulfonyl-3-isobutyl parabanic acid

In the manner given in Example 22, 1-phenysulfonyl-2,2-dichloro - 3 - isobutyl-4,5-imidazolidinedione was hydrolyzed to give 1-phenylsulfonyl-3-isobutyl parabanic acid.

EXAMPLE 27

1-phenylsulfonyl-3-n-propyl parabanic acid

In the manner given in Example 22, 1-phenylsulfonyl-2,2-dichloro-3-n-propyl - 4,5 - imidazolidinedione was hydrolyzed to give 1-phenylsulfonyl-3-n-propyl parabanic acid.

EXAMPLE 28

1-phenylsulfonyl-3-n-pentyl parabanic acid

In the manner given in Example 22, 1-phenylsulfonyl-2,2-dichloro-3-n-pentyl - 4,5 - imidazolidinedione was hydrolyzed to give 1-phenylsulfonyl-3-n-pentyl parabanic acid.

EXAMPLE 29

1-[(4-butylphenyl)sulfonyl]-3-ethyl parabanic acid

In the manner given in Example 22, 1-[(4-butylphenyl)sulfonyl]-2,2-dimethyl - 3 - ethyl-4,5-imidazolidinedione was hydrolyzed to give 1-[(4-butylphenyl)sulfonyl] - 3-ethyl parabanic acid.

EXAMPLE 30

1-(p-tolylsulfonyl)-3-n-propyl parabanic acid

In the manner given in Example 22, 1-(p-tolylsulfonyl)-2,2-dichloro-3-n-propyl-4,5-imidazolidinedione was hydrolyzed to give 1-(p-tolylsulfonyl)-3-n-propyl parabanic acid.

EXAMPLE 31

1-(p-tolylsulfonyl)-3-cyclopentyl parabanic acid

In the manner given in Example 22, 1-(p-tolylsulfonyl)-2,2-dichloro-3-cyclopentyl - 4,5 - imidazolidinedione was hydrolyzed to give 1-(p-tolylsulfonyl)-3-cyclopentyl parabanic acid.

EXAMPLE 32

1-(p-tolylsulfonyl)-3-cyclooctyl parabanic acid

In the manner given in Example 22, 1-(p-tolylsulfonyl)-2,2-dichloro-3-cyclooctyl - 4,5 - imidazolidinedione was hydrolized to give 1 - (p-tolylsulfonyl) - 3 - cyclooctyl parabanic acid.

EXAMPLE 33

1-(p-tolylsulfonyl)-3-hexamethyleneimino parabanic acid

In the manner given in Example 22, 1-(p-tolylsulfonyl)-2,2-dichloro-3-hexamethyleneimino - 4,5 - imidazolidinedione was hydrolyzed to give 1-(p-tolylsulfonyl)-3-hexamethyleneimino parabanic acid.

EXAMPLE 34

1-[(4-chlorophenyl)sulfonyl]-3-n-propyl parabanic acid

In the manner given in Example 22, 1-[(4-chlorophenyl)sulfonyl] - 2,2 - dichloro-3-n-propyl-4,5-imidazolidinedione was hydrolyzed to give 1-[(4-chlorophenyl)sulfonyl]-3-n-propyl parabanic acid.

EXAMPLE 35

1-[(4-chlorophenyl)sulfonyl]-3-cycloheptyl parabanic acid

In the manner given in Example 22, 1-[(4-chlorophenyl)sulfonyl] - 2,2 - dichloro-3-cycloheptyl-4,5-imidazolidinedione was hydrolyzed to give 1-[(4-chlorophenyl)sulfonyl]-3-cycloheptyl parabanic acid.

EXAMPLE 36

1-[(4-bromophenyl)sulfonyl]-3-cycloheptyl parabanic acid

In the manner given in Example 22, 1-[(4-bromophenyl)sulfonyl] - 2,2 - dichloro-3-cycloheptyl-4,5-imidazolidinedione was hydrolyzed to give 1-[(4-bromophenyl)sulfonyl]-3-cycloheptyl parabanic acid.

EXAMPLE 37

1-[(4-chlorophenyl)sulfonyl]-3-hexamethyleneimino parabanic acid

In the manner given in Example 22, 1-[(4-chlorophenyl)sulfonyl] - 2,2 - dichloro-3-hexamethyleneimino-4,5-imidazolidinedione was hydrolyzed to give 1-[(4-chlorophenyl)sulfonyl]-3-hexamethyleneimino parabanic acid.

EXAMPLE 38

1-[(4-acetylphenyl)sulfonyl]3-cyclohexyl parabanic acid

In the manner given in Example 22, 1-[(4-acetylphenyl)sulfonyl] - 2,2 - dichloro - 3-cyclohexyl-4,5-imidazolidinedione was hydrolyzed to give 1-[(4-acetylphenyl)sulfonyl]-3-cyclohexyl parabanic acid.

EXAMPLE 39

1-[(4-acetylphenyl)sulfonyl]-3-hexamethyleneimino parabanic acid

In the manner given in Example 22, 1-[(4-acetylphenyl)sulfonyl] - 2,2 - dichloro-3-hexamethyleneimino-4,5-imidazolidinedione was hydrolyzed to give 1-[(4-acetylphenyl)sulfonyl]-3-hexamethyleneimino parabanic acid.

EXAMPLE 40

1-[(4-butyrylphenyl)sulfonyl]-3-n-propyl parabanic acid

In the manner given in Example 22, 1-[(4-butyrylphenyl)sulfonyl] - 2,2 - dichloro-3-n-propyl-4,5-imidazolidinedione was hydrolyzed to give 1-[(4-butyrylphenyl)sulfonyl]-3-n-propyl parabanic acid.

EXAMPLE 41

1-[(4-hexanoylphenyl)sulfonyl]-3-n-butyl parabanic acid

In the manner given in Example 22, 1-[(4-hexanoylphenyl)sulfonyl] - 2,2 - dichloro-3-n-butyl-4,5-imidazolidinedione was hydrolyzed to give 1-[(4-hexanoylphenyl)sulfonyl]-3-n-butyl parabanic acid.

EXAMPLE 42

1-(p-tolylsulfonyl)-2,2-dimethoxy-3-ethyl-4,5-imidazolidinedione

A quantity of 1.4 g. of 1-(p-tolylsulfonyl)-2,2-dichloro-3-ethyl-4,5-imidazolidinedione was dissolved in 8 ml. of methanol to which was added 0.3 ml. of water. The solution was refluxed for 5 minutes. The mixture was then cooled to room temperature and 20 ml. of ice-water was added causing crude 1-(p-tolylsulfonyl)-2,2-dimethoxy-3-ethyl-4,5-imidazolidinedione to precipitate. The thus-obtained crude product was recrystallized from benzene-ligroin to give pure 1-(p-tolylsulfonyl)-2,2-dimethoxy-3-ethyl-4,5-imidazolidinedione of melting point 126–128° C.

Analysis.—Calcd. for $C_{14}H_{18}N_2O_6S$: N, 8.18. Found: N, 8.68.

EXAMPLE 43

1-phenylsulfonyl-2,2-dimethoxy-3-n-butyl-4,5-imidazolidinedione

In the manner given in Example 42, 1-phenylsulfonyl-2,2-dichloro-3-n-butyl-4,5-imidazolidinedione was hydrolyzed in methanol containing a small amount of water to give 1-phenylsulfonyl - 2,2 - dimethoxy-3-n-butyl-4,5-imidazolidinedione of melting point 102–104° C.

Analysis.—Calcd. for $C_{15}H_{20}N_2O_6S$: C, 50.54; H, 5.65; N, 7.85. Found: C, 50.68; H, 5.09; N, 7.97.

EXAMPLE 44

1-(p-tolylsulfonyl)-2,2-dimethoxy-3-n-butyl-4,5-imidazolidinedione

In the manner given in Example 42, 1-(p-tolylsulfonyl)-2,2-dichloro-3-n-butyl-4,5-imidazolidinedione was hydrolyzed in methanol containing a small amount of water to give 1-(p-tolylsulfonyl)-2,2 - dimethoxy-3-n-butyl-4,5-imidazolidinedione.

EXAMPLE 45

1-(p-tolylsulfonyl)-2,2-diethoxy-3-n-butyl-4,5-imidazolidinedione

In the manner given in Example 42, 1-(p-tolylsulfonyl)-2,2-dichloro-3-n-butyl-4,5-imidazolidinedione was hydrolyzed in ethanol containing a small amount of water to give 1-(p-tolylsulfonyl) - 2,2-diethoxy-3-n-butyl-4,5-imidazolidinedione.

EXAMPLE 46

1-(p-tolylsulfonyl)-2,2-dibutoxy-3-n-butyl-4,5-imidazolidinedione

In the manner given in Example 42, 1-(p-tolylsulfonyl)-2,2-dichloro-3-n-butyl-4,5-imidazolidinedione was hydrolyzed in n-butanol containing a small amount of water to give 1-(p-tolylsulfonyl)-2,2-dibutoxy-3-n-butyl-4,5-imidazolidinedione.

EXAMPLE 47

1-[(4-n-butylphenyl)sulfonyl]-2,2-diethoxy-3-ethyl-4,5-imidazolidinedione

In the manner given in Example 42, 1-[(4-n-butylphenyl)sulfonyl] - 2,2 - diethoxy - 3 - ethyl - 4,5 - imidazolidinedione was hydrolyzed in ethanol containing a small amount of water to give 1-[(4-n-butylphenyl)sulfonyl] - 2,2 - diethoxy - 3 - ethyl - 4,5 - imidazolidinedione.

EXAMPLE 48

1-(6-tolylsulfonyl)-2,2-dipropoxy-3-hexamethyleneimino-4,5-imidazolidinedione

In the manner given in Example 42, 1-(p-tolylsulfonyl-2,2 - dichloro - 3 - n - hexamethyleneimino - 4,5 - imidazolidinedione was hydrolyzed in propanol containing a small amount of water to give 1-(p-tolylsulfonyl)-2,2-dipropoxy-3-hexamethyleneimino-4,5-imidazolidinedione.

EXAMPLE 49

1-[(4-chlorophenyl)sulfonyl]-2,2-diethoxy-3-n-propyl-4,5-imidazolidinedione

In the manner given in Example 42, 1-[(4-chlorophenyl)sulfonyl] - 2,2 - dichloro - 3 - n - propyl - 4,5-imidazolidinedione was hydrolyzed in ethanol containing a small amount of water to give 1-[(4-chlorophenyl)sulfonyl] - 2,2 - diethoxy - 3 - n - propyl - 4,5 - imidazolidinedione.

EXAMPLE 50

1-[(4-bromophenyl)sulfonyl]-2,2-dimethoxy-3-cycloheptyl-4,5-imidazolidinedione

In the manner given in Example 42, 1-[(4-bromophenyl)sulfonyl] - 2,2 - dichloro - 3 - cycloheptyl - 4,5 - imidazolidinedione was hydrolyzed in methanol containing a small amount of water to give 1-[(4-bromophenyl)sulfonyl] - 2,2 - dimethoxy - 3 - cycloheptyl - 4,5 - imidazolidinedione.

EXAMPLE 51

1-[(4-acetylphenyl)sulfonyl]-2,2-diethoxy-3-cyclo-hexyl-4,5-imidazolidinedione

In the manner given in Example 42, 1-[(4-acetylphenyl)sulfonyl] - 2,2 - dichloro - 3 - cyclohexyl - 4,5 - imidazolidinedione was hydrolyzed in ethanol containing a small amount of water to give 1-[(4-acetylphenyl)sulfonyl] - 2,2 - diethoxy - 3 - cyclohexyl - 4,5 - imidazolidinedione.

In the manner given in Example 22, other 1-alkyl- or aryl-substituted-sulfonyl - 2,2 - dialkoxy - 3 - substituted-4,5 - imidazolidinediones can be prepared by hydrolyzing the corresponding 1-alkyl- or aryl-substituted-2,2-dichloro-3-substituted-4,5-imidazolidinediones in a lower alkanol containing from 1 to 4 carbon atoms, inclusive, containing a low percentage of water. Representative 1-alkyl- or aryl-substituted-2,2-dialkoxy-3-substituted - 4,5-imidazolidinediones thus obtained include 1-[(4-phenyl)sulfonyl]-2,2-dipropoxy-3-ethyl-4,5-imidazolidinedione,
1-[(4-phenyl)sulfonyl]-2,2-diethoxy-3-isobutyl-4,5-imidazolidinedione,
1-[(4-phenyl)sulfonyl]-2,2-diethoxy-3-pentyl-4,5-imidazolidinedione,
1-(p-tolylsulfonyl)-2,2-dipropoxy-3-ethyl-4,5-imidazolidinedione,
1-[(3-propylphenyl)sulfonyl]-2,2-dipropoxy-3-ethyl-4,5-imidazolidinedione,
1-(p-tolylsulfonyl)-2,2-diisopropoxy-3-propyl-4,5-imidazolidinedione,
1-(p-tolylsulfonyl)-2,2-diethoxy-3-cyclohexyl-4,5-imidazolidinedione,
1-(p-tolylsulfonyl)-2,2-dimethoxy-3-cyclopentyl-4,5-imidazolidinedione,
1-(p-tolylsulfonyl)-2,2-isobutyloxy-3-hexamethyleneimino-4,5-imidazolidinedione,
1-[(4-chlorophenyl)sulfonyl]-2,2-dimethoxy-3-cycloheptyl-4,5-imidazolidinedione,
1-[(4-chlorophenyl)sulfonyl]-2,2-propoxy-3-hexamethyleneimino-4,5-imidazolidinedione,
1-[(4-acetylphenyl)sulfonyl]-2,2-diethoxy-3-hexamethyleneimino-4,5-imidazolidinedione,
1-[(4-butyrylphenyl)sulfonyl]-2,2-diethoxy-3-propyl-4,5-imidazolidinedione,
1-[(4-ethylphenyl)sulfonyl]-2,2-dimethoxy-3-ethyl-4,5-imidazolidinedione,
1-methanesulfonyl-2,2-diethoxy-3-n-butyl-4,5-imidazolidinedione,
1-n-butylsulfonyl-2,2-dipropoxy-3-cyclohexyl-4,5-imidazolidinedione,
1-cyclohexylsulfonyl-2,2-diethoxy-3-n-butyl-4,5-imidazolidinedione, and the like.

EXAMPLE 52

N-(p-tolylsulfonyl)-N'-n-butylurea 1 g. of 1-(p-tolylsulfonyl)-3-n-butyl parabanic acid was hydrolyzed by heating for a period of 1 hour on a water bath in a solution consisting of 10 ml. ethanol, 1 ml. water and 0.5 g. of sodium hydroxide. The mixture was then cooled filtered, the filtrate was neutralized with dilute hydrochloric acid and the thus-precipitated, crude N-(p-tolylsulfonyl)-N'-n-butylurea was recrystallized from ethanol to give pure N-(p-tolylsulfonyl)-N'-n-butylurea-[tolbutamide].

EXAMPLE 53

N-[(p-chlorophenyl)sulfonyl]-N'-n-propylurea

In the same manner given in Example 52, 1-[(p-chlorophenyl)sulfonyl]-3-n-propyl parabanic acid was hydrolyzed with sodium hydroxide to give N-[(p-chlorophenyl)sulfonyl]-N'-n-propylurea.

In the manner given in Example 52, other 1-arylsulfonyl and alkylsulfonyl-3-substituted parabanic acids can be converted to the corresponding N-arylsulfonyl-N'-substituted ureas which are presently used for the treatment of diabetes mellitus.

EXAMPLE 54

N-(p-tolylsulfonyl)-N'-n-butylurea

A solution of 1 g. of 1-(p-tolylsulfonyl)-2,2-dimethoxy-3-n-butyl-4,5-imidazolidinedione was refluxed for 1 hour in a mixture containing 10 ml. ethanol, 1 ml. of concentrated hydrochloric acid and 1 ml. of water. Thereafter, the mixture was cooled to room temperature and 15 ml. of 1 N hydrochloric acid was added. A precipitate of N-(p-tolylsulfonyl)-N'-n-butylurea was recovered from the mixture by filtration, and purified further by dissolution in ammonia aqueous solution and reprecipitation with hydrochloric acid.

In the manner given in Example 54, other N-aryl-N'-substituted urea compounds having hypoglycemic activity can be produced by hydrolyzing with a mineral acid, particularly hydrochloric acid, the corresponding 1-alkyl- or aryl-substituted-sulfonyl-2,2-dichloro- or 2,2-dialkoxy-4,5-imidazolidinedione.

We claim:

1. A 1 - substituted-sulfonyl-2,2-dichloro-4,5-imidazolidindione of the formula:

$$\begin{array}{c} O=C\text{———}C=O \\ R-SO_2-N\qquad N-R' \\ \diagdown C \diagup \\ Cl\quad Cl \end{array}$$

wherein R is selected from the group consisting of alkyl of from 1 to 6 carbon atoms, inclusive, cycloalkyl of from 5 to 8 carbon atoms, inclusive, phenyl, alkylphenyl in which the alkyl is defined as above, p-chlorophenyl, p-acetylphenyl, p-alkoxyphenyl, m-alkoxyphenyl and p,m-dialkoxyphenyl, in which the alkyl of the alkoxy group is defined as hereinabove, and wherein R' is selected from the group consisting of alkyl of from 2 to 8 carbon atoms, inclusive, cycloalkyl defined as above, and hexamethyleneimino.

2. 1 - (p - tolylsulfonyl) - 2,2 - dichloro - 3 - n - butyl-4,5-imidazolidinedione.

3. 1 - (p - tolylsulfonyl) - 2,2 - dichloro - 3 - ethyl-4,5-imidazolidinedione.

4. 1 - phenylsulfonyl - 2,2 - dichloro - 3 - n - butyl - 4,5-imidazolidinedione.

5. 1 - phenylsulfonyl - 2,2 - dichloro - 3 - ethyl - 4,5-imidazolidinedione.

6. 1 - [(4 - chlorophenyl)sulfonyl] - 2,2 - dichloro - 3-n-propyl-4,5-imidazolidinedione.

7. 1 - [(4 - chlorophenyl)sulfonyl] - 2,2 - dichloro - 3-n-butyl-4,5-imidazolidinedione.

8. 1 - methylsulfonyl - 2,2 - dichloro - 3 - n - propyl-4,5-imidazolidinedione

9. A 1-substituted-2,2-dialkoxy-4,5-imidazolinedione of the formula:

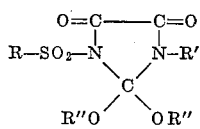

wherein R is selected from the group consisting of alkyl of from 1 to 6 carbon atoms, inclusive, cycloalkyl of from 5 to 8 carbon atoms, inclusive, phenyl, alkylphenyl wherein the alkyl is defined as above, p-chlorophenyl, p-acetylphenyl, p-alkoxyphenyl, m-alkoxyphenyl, and p,m-dialkoxyphenyl in which the alkyl of the alkoxy group is defined as hereinabove, wherein R' is selected from the group consisting of alkyl of from 2 to 8 carbon atoms, inclusive, cycloalkyl defined as above, and hexamethyleneimino, and wherein R'' is alkyl of from 1 to 4 carbon atoms, inclusive.

10. 1 - (p - tolylsulfonyl) - 2,2 - dimethoxy - 3 - n-butyl-4,5-imidazolidinedione.

11. 1 - phenylsulfonyl - 2,2 - dimethoxy - 3 - n - butyl-4,5-imidazolidinedione.

12. 1 - (p - tolylsulfonyl) - 2,2 - diethoxy - 3 - n - butyl-4,5-imidazolidinedione.

13. 1 - [(4 - chlorophenyl)sulfonyl] - 2,2 - diethoxy - 3-n-propyl-4,5-imidazolidinedione.

References Cited
UNITED STATES PATENTS

| | | | |
|---|---|---|---|
| 3,069,466 | 12/1962 | Pantlitschko | 260—553 |
| 3,097,241 | 7/1963 | Korger et al. | 260—553 |
| 3,105,006 | 9/1963 | Wright | 260—553 |
| 3,121,102 | 2/1964 | Tull et al. | 260—553 |

FOREIGN PATENTS 1,305,723  8/1962  France.

OTHER REFERENCES

The Merck Index 7th ed., p. 183, Rahway, N.J., Merck, 1960.

Stachel, Angewandte Chemie, vol. 71, p. 246 (1959).

JOHN D. RANDOLPH, *Primary Examiner.*

WALTER A. MODANCE, *Examiner.*

NATALIE TROUSOF, *Assistant Examiner.*